United States Patent [19]
Suzuki

[11] Patent Number: 5,435,629
[45] Date of Patent: Jul. 25, 1995

[54] WHEEL FOR VEHICLE

[75] Inventor: Junichi Suzuki, Shizuoka, Japan

[73] Assignee: Embishi Aluminum Wheels Ltd., Iwata, Japan

[21] Appl. No.: 808,224

[22] Filed: Dec. 16, 1991

[30] Foreign Application Priority Data

Jul. 9, 1991 [JP] Japan .................. 3-61010 U

[51] Int. Cl.[6] ........................................ B60B 25/02
[52] U.S. Cl. .................. 301/29.2; 301/64.4; 301/11.2
[58] Field of Search ............ 301/9.1, 10.1, 11.1, 301/35.3, 64.3, 64.4, 29.2

[56] References Cited

U.S. PATENT DOCUMENTS

| | | | |
|---|---|---|---|
| 4,223,952 | 9/1980 | Weld | 301/63 DS |
| 4,466,670 | 8/1984 | Kaji | 301/11 CD |
| 5,018,566 | 5/1991 | Titon | 301/11 CD X |

FOREIGN PATENT DOCUMENTS

| | | | |
|---|---|---|---|
| 103369 | 11/1937 | Australia | 301/11 CD |
| 1129564 | 1/1957 | France | 301/63 DD |
| 2582586 | 12/1986 | France . | |
| 2443088 | 4/1975 | Germany | 301/63 DD |
| 2644273 | 4/1977 | Germany . | |
| 3844331 | 7/1990 | Germany . | |
| 0028703 | 2/1988 | Japan | 301/10 R |
| 0227402 | 9/1988 | Japan | 301/63 DS |

Primary Examiner—Russell D. Stormer
Attorney, Agent, or Firm—Burns, Doane, Swecker & Mathis

[57] ABSTRACT

A vehicle wheel is of a three-piece sandwich type and high in accuracy and rigidity and can be manufactured less expensively and more efficiently. The radially outer portions of the flanges of an inner rim part and an outer rim part, which constitute a rim assembly for supporting a tire, are located in contact with each other outside the peripheral edge of a disk in the radial direction thereof so that the portions constitute a butted part. The rim parts are clamped to each other by bolts and nuts in such a manner that the radially inner portions of the flanges pinch the flange of the disk on both the sides of the latter flange. The butted part is provided with a welding seal on the peripheral surfaces of the flanges of the rim parts.

7 Claims, 3 Drawing Sheets

WHEEL FOR VEHICLE

BACKGROUND OF THE INVENTION

This invention relates to a wheel for a vehicle, and more particularly relates to a wheel of high accuracy and rigidity, which is for a vehicle and is manufactured less expensively and more efficiently of three separately prepared pieces which are a disk, an inner rim part and an outer rim part.

In recent years, many wheels each made of a light alloy and high in strength, rigidity and dimensional accuracy have been used for motor vehicles along with the enhancement of the performance of the vehicles or that of the performance of the tires thereof. The wheels are formed by casting, forging or the like so that the disks thereof have various shapes to be high in strength and good in exterior view or design. The wheels are classified into three types which are a one-piece type, a two-piece type and a three-piece type. The wheel of the one-piece type is made of a piece monolithically prepared by casting, forging or the like and including a rim and a disk. The wheel of the two-piece type is made of two separately prepared pieces which are a rim and a disk and fixedly conjoined to each other by welding or bolt clamping. The wheel of the three-piece type is made of three separately prepared pieces which are an inner rim, an outer rim and a disk which are fixedly conjoined to each other by welding or bolt clamping.

The constitution of the wheel of the three-piece type, which allows the weight of the wheel to be reduced and is relatively high in rigidity, and the way of assembling the pieces of the wheel are described hereafter. FIG. 4 shows an example 23 of the wheel, which is also called an under-head-type wheel, and includes an inner rim portion 25, an outer rim portion 26, and a disk 24 which are separately formed. The flanges 27 and 28 of the inner and the outer rim portions 25 and 26 are set on each other, and then clamped to the outer design surface of the disk 24 by bolts 11 and nuts 12. The outer circumferential edges of the mutually conjoined surfaces of the flanges 27 and 28 are welded to each other at 10 in order to prevent air from leaking out of a tire 5 fitted on a rim assembly consisting of the inner and the outer rim portions 25 and 26. The disk 24 has a hub hole 13, and four to six bolt holes 14 which are located at equal intervals on a circle concentric to the disk and which each have a circular cross section. The disk 24 is secured to a hub by wheel nuts.

FIG. 5 shows another example 30 of the wheel of the three-piece type, which is also called an overhead-type wheel, and includes an inner rim portion 32, an outer rim portion 33 and a disk 31 which are separately formed. The flanges 34 and 35 of the inner and the outer rim portions 32 and 33 are set on each other, and then clamped to the mounting surfaces of the disk 31 by bolts 11 and nuts 12. The outer circumferential edges of the mutually conjoined surfaces of the flanges 34 and 35 are welded to each other at 10 in order to prevent air from leaking out of a tire 5 fitted on a rim assembly consisting of the rim portions. The disk 31 has a hub hole 13, and four to six bolt holes 14 which are located at equal intervals on a circle concentric to the disk and each have a circular cross section. The disk 31 is secured to a hub by wheel nuts.

FIG. 6 shows yet another example 37 of the wheel of the three-piece type, which is also called a sandwich-type wheel, and includes an inner rim portion 39, an outer rim portion 40 and a disk 38 which are separately formed. The flanges 41 and 42 of the inner and the outer rim portions 39 and 40 are clamped to the sides of the peripheral portion 43 of the disk 38 at the mounting surface and design surface thereof by bolts 11 and nuts 12 so that the flanges pinch the portion. The outer circumferential edges of the mutually conjoined surfaces of the disk 38 and the flanges 41 and 42 are welded to each other at 10 in order to prevent air from leaking out of a tire 5 fitted on a rim assembly consisting of the inner and the outer rim portions 39 and 40. The disk 38 has a hub hole 13, and four to six bolt holes 14 which are located at equal intervals on a circle concentric to the disk and which each have a circular cross section. The disk 38 is secured to a hub by wheel nuts.

Since the flanges 41 and 42 of the inner and outer rim portions 39 and 40 of the sandwich-type wheel 37 pinch the peripheral portion 43 of the disk 38 on both the sides thereof, the wheel needs to have two welding seals 10 for preventing the air from leaking out of the tire 5. For that reason, the wheel 37 requires two times as much welding as the other wheels 23 and 30 of the three-piece type, and is more expensive than them. This is a problem.

SUMMARY OF THE INVENTION

The present device was made in order to solve the problem mentioned above. Accordingly, it is an object of the device to provide a wheel which is of a three-piece sandwich type for a vehicle and high in accuracy and rigidity and which can be manufactured less expensively and more efficiently.

In the wheel, an inner rim part and outer rim parts, which constitute a rim assembly for supporting a tire, have flanges extending toward the axis of rotation of the wheel, and a disk, which is mounted on a hub, and the rim parts are conjoined to each other by bolts and nuts in such a manner that the flanges pinch the peripheral portion of the disk on both the sides of the portion. The flanges of the rim parts are located in contact with each other outside the peripheral edge of the disk in the radial direction thereof so that the flanges constitute a butted part provided with a seal means for preventing air from leaking out of the tire.

The seal means is a welding seal provided as a result of welding the butted part, a sealing agent applied to the part, a seal interposed in between the mutually butted surfaces of the flanges at the time of the mutual conjoining thereof, or the like.

DETAILED DESCRIPTION OF THE PREFERRED EMBODIMENTS

Embodiments of the present device are hereafter described with reference to the drawings attached hereto.

Figure 1:
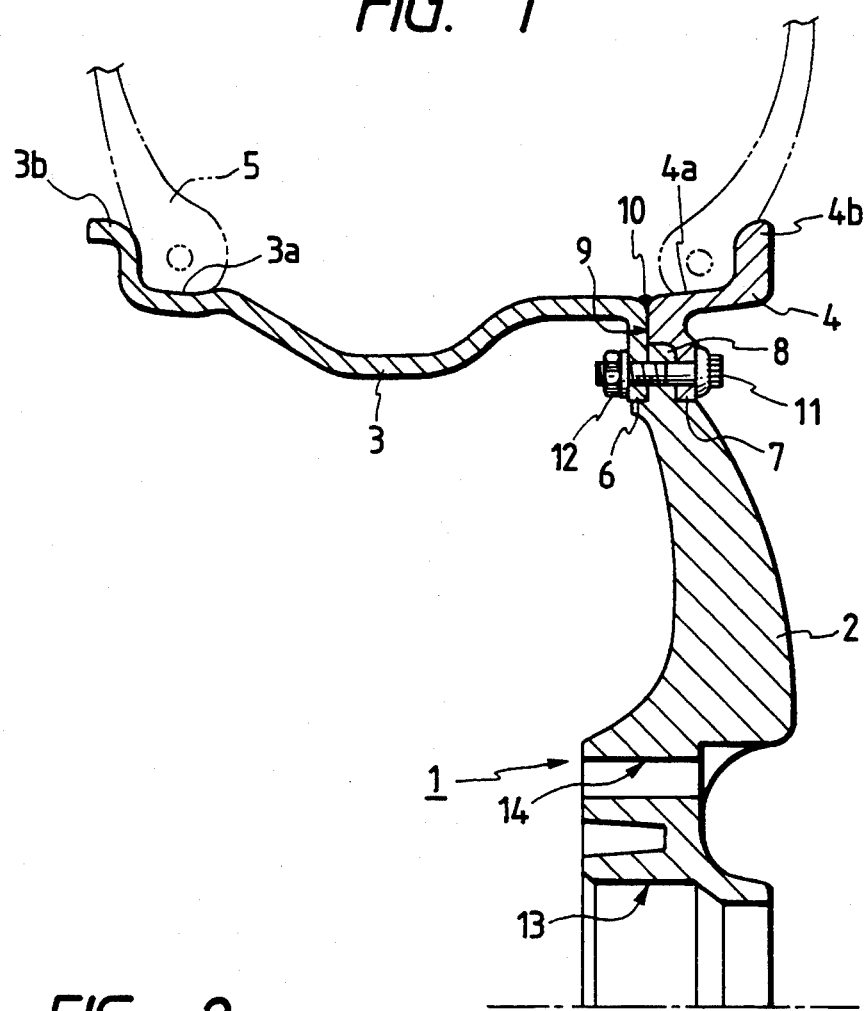
FIG. 1 is a partial sectional view of a wheel which is an embodiment of the present device and is for a vehicle.

FIG. 1 shows a wheel 1 which is one of the embodiments and is for a vehicle. The wheel 1 includes a disk 2, an inner rim part 3 and an outer rim part 4 which are fixedly conjoined to each other by bolts 11 and nuts 12.

The inner rim part 3 is made of aluminum alloy, and has a bead rest 3a for supporting a tire 5 at one bead thereof, a side edge portion 3b, and another side edge portion which is a flange 6. The bead rest 3a and the central portion of the inner rim 3 are monolithically formed. The flange 6 has bolt holes at equal intervals along the circumference of the rim part 3, and extends in the circumferential direction thereof and toward the axis of rotation of the wheel 1.

The outer rim part 4 is made of aluminum alloy, and has a bead rest 4a for supporting the tire 5 at the other bead thereof, a side edge portion 4b, and another side edge portion which is a flange 7 having bolt holes at equal intervals along the circumference of the rim part and extending in the circumferential direction thereof and toward the axis of rotation of the wheel.

The disk 2 is made of aluminum alloy, and is then provided with a hub hole 13 and four to six bolt holes 14 through numerically controlled machining. The bolt holes 14 are located at equal intervals on a circle concentric to the disk 2, and each have a circular cross section. The disk 2 is secured to a hub by wheel nuts. The peripheral portion of the disk 2 has a flange 8 having bolt holes at equal intervals along the circumference of the disk, and extending in the circumferential direction thereof and outward in the radial direction thereof.

Figure 2:
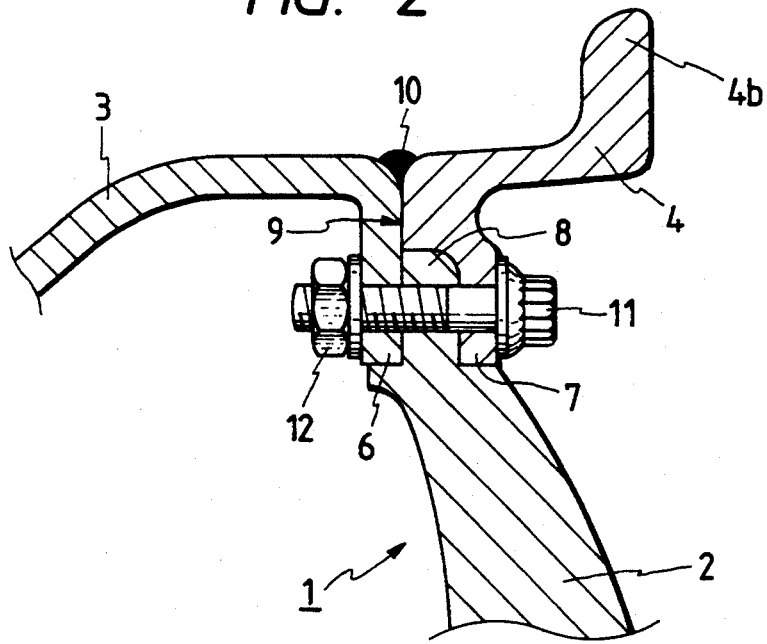
FIG. 2 is an enlarged sectional view of a major part of the wheel.
Figure 3:
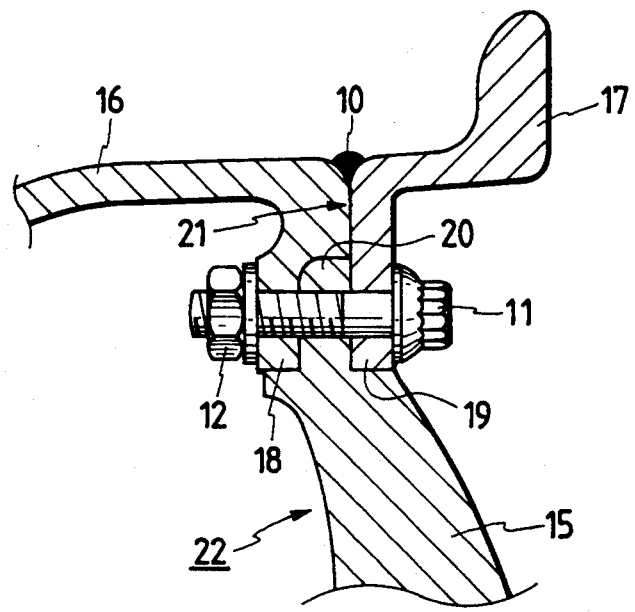
FIG. 3 is an enlarged sectional view of a major part of a wheel which is another embodiment of the present device and is for a vehicle.
Figure 4:
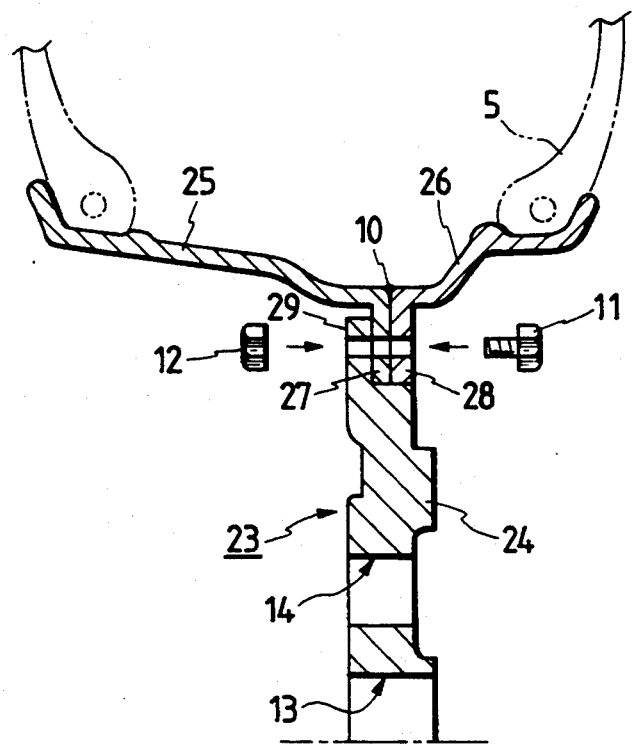
FIG. 4 is a partial sectional view of a conventional wheel for a vehicle.
Figure 5:
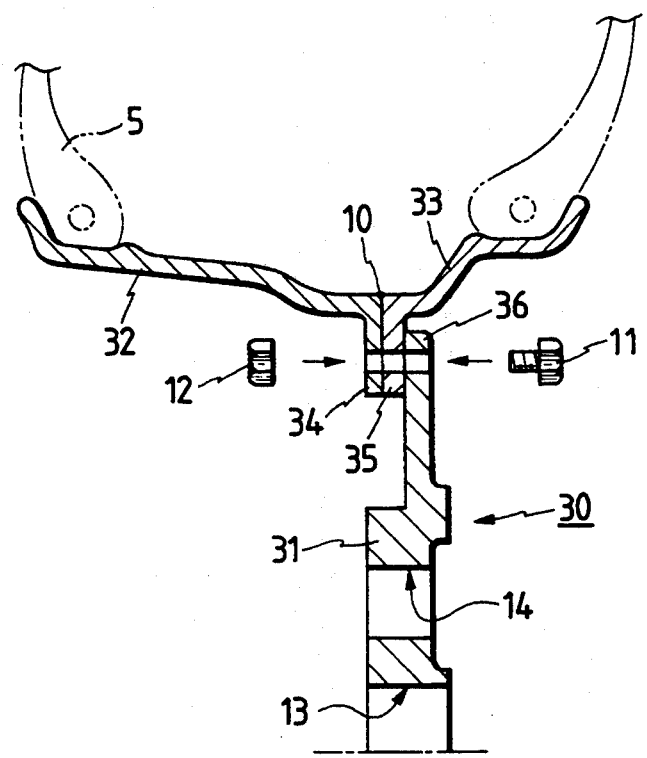
FIG. 5 is a partial sectional view of another conventional wheel for a vehicle.
Figure 6:
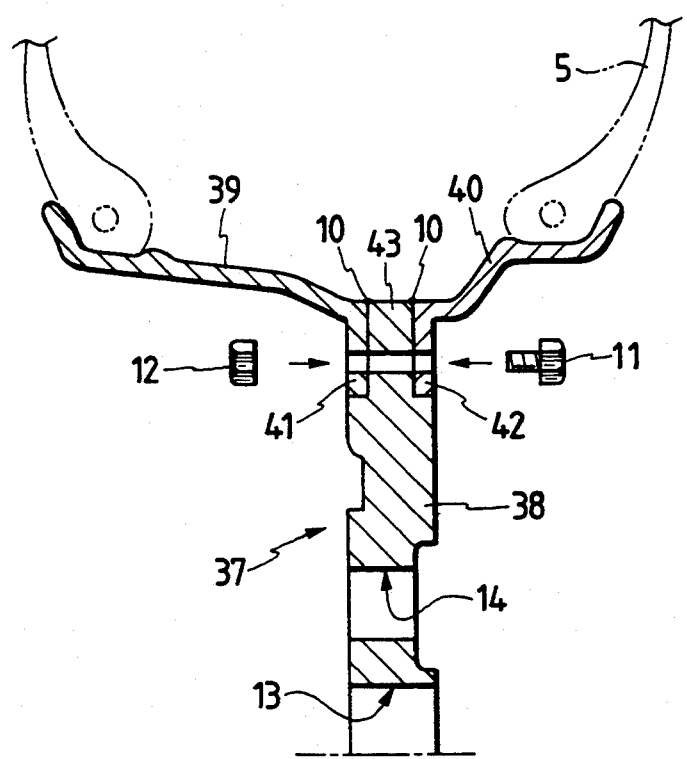
FIG. 6 is a partial sectional view of yet another conventional wheel for a vehicle.

A procedure of conjoining the disk 2, the inner rim part 3 and the outer rim part 4 to each other is described in detail below with reference to FIG. 2. The radially outer portion of the flange 7 of the outer rim part 4 is in contact with that of the flange 6 of the inner rim part 3. The radially inner portion of the flange 7 of the outer rim part 4 extends away from that of the flange 6 of the inner rim part 3 toward the design surface of the disk 2. The thickness of a gap between the radially inner portions of the flanges 6 and 7 is substantially equal to that of the flange 8 of the disk 2.

For the conjoining, the radially inner portions of the flanges 6 and 7 of the inner and the outer rim parts 3 and 4 are first set on both the sides of the flange 8 of the disk 2 to pinch it. The flange 6 of the inner rim part 3 is located on one side of a peripheral portion of the disk 2 while the flange 7 of the outer rim part 4 is located on an opposite side of the peripheral portion of the disk 2 so that the peripheral portion of the disk is positioned between the flanges 6, 7 of the inner and outer rim parts 3,4. The bolts 11 are then inserted into the bolt holes of the flanges 6, 7 and 8 from the side of the disk 2 for the design surface thereof. The nuts 12 are engaged on the bolts 11 and tightened to clamp the flanges 6, 7 and 8 together.

At that time, the outside surface of the radially outer portion of the flange 6 of the inner rim part 3 and the inside surface of the radially outer portion of the flange 7 of the outer rim part 4 are butted to each other to constitute a butted part 9. Thus, as seen in FIGS. 1 and 2, the flange 6 of the inner rim part 3 and the flange 7 of the outer rim part 4 are in contact with one another radially outwardly of the peripheral edge of the disk 2. The butted part 9 is then provided with a welding seal 10 on the peripheral surfaces of the radially outer portions of the flanges 6 and 7 of the rims in order to prevent air from leaking out of the tire 5 fitted on the rims. Although the radially inner portions of the flanges 6 and 7 of the rim parts 3 and 4 are located on both the sides of the flange 8 of the disk 2, the radially outer portions of the flanges of the rim parts are located on each other to constitute the butted part 9 which is the only rim joint of the wheel 1 and requires the only one welding seal 10. In other words, the wheel 1 requires only one step of welding although the wheel is of the three-piece sandwich type. For that reason, the wheel 1 can be manufactured less expensively and more efficiently.

The mutually conjoined portions of the disk 2, the inner rim part 3 outer rim part 4 are not confined to being shaped in the forms in the above-described embodiment, but may be shaped in other various forms. For example, a wheel 22 which is another of the embodiments and is for a vehicle differs from the preceding one 1 in the forms of the mutually conjoined portions of the inner and the outer rim parts. The wheel 22 includes a disk 15, the inner rim part 16 and the outer rim part 17 which are fixedly conjoined to each other by bolts 11 and nuts 12. The radially outer portion of the flange 18 of the inner rim part 16 is located in contact with that of the flange 19 of the outer rim part 17. The radially inner portion of the flange 18 of the inner rim part 16 extends away from that of the flange 19 of the outer rim part 17 toward the mounting surface of the disk 15. The thickness of a gap between the radially inner portions of the flanges 18 and 19 is substantially equal to that of the flange 20 of the disk 15. To conjoin the disk, the inner rim part 16 and the outer rim part 17 to each other, the radially inner portions of the flanges 18 and 19 of the rims are first set on both the sides of the flanges 20 of the disk. The bolts 11 are then inserted into the bolt holes of the flanges 18, 19 and 20 from the side of the disk 15 for the design surface thereof. The nuts 12 are engaged on the bolts 11 and tightened to clamp the disk and the rim parts to each other. At that time, the outside surface of the radially outer portion of the flange 18 of the inner rim part 16 and the inside surface of the radially outer portion of the flange 19 of the outer rim part 17 are butted to each other to constitute a butted part 21. The butted part 21 is then provided with a welding seal 10 on the peripheral surfaces of the radially outer portions of the flanges 18 and 19 of the rim parts 16 and 17 in order to prevent air from leaking out of a tire fitted on the rims. The butted part 21 is the only rim joint of the wheel 22, and requires the only welding seal 10. In other words, the wheel 22 requires only one step of welding although the wheel is of the three-piece sandwich type. For that reason, the wheel 22 can be manufactured less expensively and more efficiently.

Each of the embodiments may be modified in such a manner that the radially outer portions of the flanges of the inner and the outer rim parts are located on each other, the radially inner portions of the flanges are bent to extend away from each other toward the design surface and mounting surface of the disk, a gap whose thickness is substantially equal to that of the flange of the disk is defined between the radially inner portions of the rim parts, the disk and the rim parts are clamped to each other by bolts and nuts to cause the flanges of the rim parts to pinch that of the disk in the gap, and a butted part constituted by the mutually butted surfaces of the radially outer portions of the flanges of the rim parts is provided with a welding seal on the peripheral surfaces of the portions.

Instead of providing the welding seal in each of the embodiments, it may be possible to apply a sealing agent to the joint of the peripheral surfaces of the radially outer portions of the flanges of the inner and the outer rim parts, interpose a seal in between the butted surfaces of the portions, or do the like. Besides, the bead rests of the rim parts, the central portion of the inner rim part, the design surface of the disk and so forth are not confined to being shaped in the forms in the embodiments, but may be shaped in other various forms. Moreover, the mutually conjoined surfaces of the inner and the outer rim parts may be located on the central portion of the rim assembly of each of the wheels 1 and 22.

A wheel provided for a vehicle in accordance with the present device includes an inner rim part and an outer rim part which constitute a rim assembly for supporting a tire and have flanges extending toward the axis of rotation of the wheel, and a disk pinched by the flanges of the rim parts on both the sides of the peripheral surface of the disk and capable of being secured to a hub. The flanges of the rim parts are located in contact with each other outside the peripheral edge of the disk in the radial direction thereof so that the flanges constitute a butted part which is the only rim joint that the wheel has although the wheel is of the three-piece sandwich type. Since the rim joint requires only one welding seal means for preventing air from leaking out of the tire, the wheel requires only one step of welding. For that reason, a wheel high in accuracy and rigidity can be manufactured less expensively and more efficiently.

What is claimed is:

1. A wheel for a vehicle comprising:
   an inner rim part and an outer rim part for supporting a tire, each of said inner rim pan and said outer rim part having a flange that extends toward an axis of rotation of said wheel;
   a disk; and
   means for fixing said inner rim pan and said outer rim pan to said disk, said disk being mounted on a hub adapted to said vehicle,
   said flange of said inner rim part being located on one side of a peripheral portion of said disk and said flange of said outer rim part being located on an opposite side of the peripheral portion of said disk so that the peripheral portion of the disk is positioned between the flange of the inner rim part and the flange of the outer rim part, said disk having an axially extending shoulder on the one side of the peripheral portion of the disk and an axially extending shoulder on the opposite side of de peripheral portion of the disk, said flange of the inner time part being positioned on the shoulder on the one side of the peripheral portion of the disk and said flange of the outer rim part being positioned on the shoulder on the opposite side of the peripheral portion of the disk, the flange of said inner rim part and the flange of said outer rim part each having a contacting surface which faces towards the flange of the other of said inner and outer rim parts, said contacting surface of one flange contacting the peripheral portion of the disk and the entire contacting surface of the one flange lying in a common plane, the contacting surface of the one flange being in contact with the contacting surface of the other flange radially outwardly of a peripheral edge of the disk to form a butted portion provided with seal means for preventing air from leaking out of said tire.

2. A wheel for a vehicle as claimed in claim 1, wherein said means for fixing comprises bolts and nuts.

3. A wheel for a vehicle as claimed in claim i, wherein said seal means comprises a welding seal.

4. A wheel for a vehicle as claimed in claim 1, wherein each of said flanges includes a radially outer portion having a peripheral surface said seal means comprising a sealing agent applied to a joint of said peripheral surfaces of the radially outer portions of said flanges.

5. A wheel for a vehicle as claimed in claim 1, wherein said seal means comprises a seal interposed between butted surfaces of said flanges.

6. A wheel for a vehicle is accordance with claim 1, wherein said means for fixing includes a plurality of bolts and a nut mounted on each of said bolts, each of said plurality of bolts extending through a hole in the peripheral portion of said disk, through a hole in the flange of said outer rim part and through a hole in the flange of said inner rim part.

7. A wheel for a vehicle in accordance with claim 6, wherein the contacting surface of the other flange includes a radially inwardly located portion that is positioned farther from the contacting surface of the one flange than a radially outwardly located portion of the other flange.

* * * * *